US008488602B2

(12) United States Patent
Corson et al.

(10) Patent No.: US 8,488,602 B2
(45) Date of Patent: Jul. 16, 2013

(54) METHODS AND APPARATUS FOR TRANSMITTING GROUP COMMUNICATION SIGNALS

(75) Inventors: M. Scott Corson, Gillette, NJ (US);
Rajiv Laroia, Basking Ridge, NJ (US);
Alan O'Neill, Henley Beach (AU);
Vincent Park, Budd Lake, NJ (US);
Murari Srinivasan, Palo Alto, CA (US);
Sathyadev Venkata Uppala,
Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1149 days.

(21) Appl. No.: 11/205,294

(22) Filed: Aug. 16, 2005

(65) Prior Publication Data
US 2007/0002859 A1    Jan. 4, 2007

Related U.S. Application Data

(60) Provisional application No. 60/601,935, filed on Aug. 16, 2004.

(51) Int. Cl.
*H04L 12/56* (2006.01)
(52) U.S. Cl.
USPC .......................................... 370/390
(58) Field of Classification Search
USPC .................. 370/218, 477, 390, 332, 399
See application file for complete search history.

(56) References Cited

U.S. PATENT DOCUMENTS

| 5,317,566 | A  | * | 5/1994  | Joshi ............................. 370/238 |
| 6,333,921 | B1 |   | 12/2001 | Grube et al. |
| 6,502,140 | B1 |   | 12/2002 | Boivie |
| 6,510,160 | B1 |   | 1/2003  | Nikuie |
| 6,577,599 | B1 |   | 6/2003  | Gupta |
| 6,628,636 | B1 | * | 9/2003  | Young .......................... 370/337 |
| 6,633,765 | B1 | * | 10/2003 | Maggenti ..................... 455/503 |
| 6,751,187 | B2 | * | 6/2004  | Walton et al. ................. 370/210 |
| 6,751,747 | B2 |   | 6/2004  | Li |

(Continued)

FOREIGN PATENT DOCUMENTS

| EP | 1401152       | 3/2004 |
| JP | 2003023656 A  | 1/2003 |

(Continued)

OTHER PUBLICATIONS

International Preliminary Report on Patentability dated Feb. 20, 2007 including Written Opinion of the International Searching Authority dated Feb. 1, 2006 from International Application PCT/US2005/29091, pp. 1-6.

(Continued)

*Primary Examiner* — Mark Rinehart
*Assistant Examiner* — Mohammad Anwar
(74) *Attorney, Agent, or Firm* — Raphael Freiwirth

(57) ABSTRACT

Group communications methods and apparatus are described. Multiple modes of group communications signaling are supported. In a first mode, copies of packets are separately transmitted to each group member in a sector or cell. In a second mode a copy of a packet is directed to multiple group members at the same time. Transitions between the two modes may be determined as a function of the cost of operating in each of the modes in terms of system cost and/or the number of group members in a cell or sector being serviced by a transmitter.

16 Claims, 10 Drawing Sheets

U.S. PATENT DOCUMENTS

| | | |
|---|---|---|
| 6,865,185 B1 | 3/2005 | Patel et al. |
| 6,873,618 B1 | 3/2005 | Weaver |
| 6,941,152 B2 * | 9/2005 | Proctor et al. ............... 455/522 |
| 6,947,434 B2 | 9/2005 | Hundscheidt |
| 6,987,749 B2 | 1/2006 | Cai et al. |
| 6,996,630 B1 * | 2/2006 | Masaki et al. ............... 709/239 |
| 7,035,657 B2 | 4/2006 | Chen et al. |
| 7,301,914 B2 | 11/2007 | Segal et al. |
| 7,391,772 B2 * | 6/2008 | Hooper et al. ............... 370/390 |
| 7,519,369 B2 | 4/2009 | Yahagi |
| 7,623,483 B2 | 11/2009 | Yi et al. |
| 2003/0027574 A1 | 2/2003 | Watanabe et al. |
| 2003/0043786 A1 * | 3/2003 | Kall et al. ............... 370/352 |
| 2003/0087653 A1 | 5/2003 | Leung et al. |
| 2003/0214906 A1 | 11/2003 | Hu et al. |
| 2003/0223393 A1 | 12/2003 | Lee |
| 2003/0236082 A1 * | 12/2003 | Aoki et al. ............... 455/278.1 |
| 2004/0184440 A1 * | 9/2004 | Higuchi et al. ............... 370/349 |
| 2004/0184471 A1 * | 9/2004 | Chuah et al. ............... 370/420 |
| 2005/0232281 A1 * | 10/2005 | Rosenzweig et al. ......... 370/400 |
| 2005/0259584 A1 | 11/2005 | Chen et al. |
| 2006/0007930 A1 * | 1/2006 | Dorenbosch ............... 370/390 |
| 2006/0050718 A1 | 3/2006 | Corson et al. |
| 2007/0159521 A1 | 7/2007 | Lane |
| 2010/0215045 A1 | 8/2010 | Figueira et al. |

FOREIGN PATENT DOCUMENTS

| | | |
|---|---|---|
| JP | 2003188818 | 7/2003 |
| JP | 2004193676 | 7/2004 |
| JP | 2004228968 | 8/2004 |
| KR | 20030041056 | 5/2003 |
| WO | WO 0241577 | 5/2002 |
| WO | WO 2004008336 | 1/2004 |
| WO | WO 2004015876 | 2/2004 |
| WO | WO 2005117345 | 12/2005 |

OTHER PUBLICATIONS

International Search Report from International Application No. PCT/US2005/29091, pp. 1-3, Feb. 1, 2006.

Nonnenmacher, J. et. al.: "Asynchronous Multicast Push: AMP," 13th International Conference on Computer Communication, Keys to a Mature Information Society. Cannes, Nov.18, 1997; pp. 419-430, XP000753920.

Supplementary European Search Report—EP05787666, Search Authority—Munich Patent Office, Apr. 1, 2010 (060606U1).

* cited by examiner

← 314

| Group ID | Group Member List | Worst Node Channel Condition and/or Location Information | Determined Multicast Transmission Characteristics | Estimated MM Tx Cost | Estimated UM Tx Cost | Preferred Multicast Tx Mode |
|---|---|---|---|---|---|---|
| 1021: 224.225.1.6 | 10.2.1.2<br>10.2.1.10 | SNR/Location of End Node with Worst Condition (Node A) | Power = 6<br>Code rate = 1/3 | 7 | 6 | Unicast |
| 1022: 224.225.1.9 | 10.2.1.5<br>10.2.1.10<br>10.2.1.27<br>10.2.1.43 | SNR/Location of End Node with Worst Condition (Node B) | Power = 7<br>Code rate = 1/6 | 9 | 18 | Multicast |

← 315

| Group Member / End Node | Node Channel Condition and/or Location Information | Determined Unicast Transmission Characteristics | Estimated Unicast Transmission Cost |
|---|---|---|---|
| 1061: 10.2.1.2 | SNR/Location End NodeA | Power = 4<br>Coderate = 1/3 | 5 |
| 1062: 10.2.1.5 | SNR/Location End NodeB | Power = 5<br>Coderate = 1/6 | 7 |
| 1063: 10.2.1.10 | SNR/Location End NodeC | Power = 1<br>Coderate = 1/2 | 1 |
| 1064: 10.2.1.27 | SNR/Location End NodeD | Power = 5<br>Coderate = 1/3 | 6 |
| 1065: 10.2.1.43 | SNR/Location End NodeE | Power = 3<br>Coderate = 1/3 | 4 |

Fig. 9

| | | | ↙ 314' | | | |
|---|---|---|---|---|---|---|
| 1001' | 1002' | 1006' | 1003' | 1004' | 1007' | 1005' |
| Group ID | Group Member List | Worst Node Channel Condition and/or Location Information | Determined Multicast Transmission Characteristics | Estimated MM Tx Cost | Estimated UM Tx Cost | Preferred Multicast Tx Mode |
| 1021' 224.225.1.6 | 10.2.1.2 10.2.1.10 10.2.1.43 | SNR/Location of End Node with Worst Condition (Node A) | Power = 6 Code rate = 1/3 | 7 | 10 | Multicast |
| 1022' 224.225.1.9 | 10.2.1.5 10.2.1.10 10.2.1.27 10.2.1.43 | SNR/Location of End Node with Worst Condition (Node B) | Power = 7 Code rate = 1/6 | 9 | 18 | Multicast |

| | ↙ 315' | | |
|---|---|---|---|
| 1051' | 1055' | 1052' | 1053' |
| Group Member / End Node | Node Channel Condition and/or Location Information | Determined Unicast Transmission Characteristics | Estimated Unicast Transmission Cost |
| 1061' 10.2.1.2 | SNR/Location End NodeA | Power = 4 Coderate = 1/3 | 5 |
| 1062' 10.2.1.5 | SNR/Location End NodeB | Power = 5 Coderate = 1/6 | 7 |
| 1063' 10.2.1.10 | SNR/Location End NodeC | Power = 1 Coderate = 1/2 | 1 |
| 1064' 10.2.1.27 | SNR/Location End NodeD | Power = 5 Coderate = 1/3 | 6 |
| 1065' 10.2.1.43 | SNR/Location End NodeE | Power = 3 Coderate = 1/3 | 4 |

| Group ID | Group Member List | Worst Node Channel Condition and/or Location Information | Determined Multicast Transmission Characteristics | Estimated MM Tx Cost | Estimated UM Tx Cost | Preferred Multicast Tx Mode |
|---|---|---|---|---|---|---|
| 1021" 224.225.1.6 | 10.2.1.2<br>10.2.1.10<br>10.2.1.43 | SNR/Location of End Node with Worst Condition (Node A) | Power = 4<br>Code rate = 1/3 | 5 | 10 | Multicast |
| 1022" 224.225.1.9 | 10.2.1.5<br>10.2.1.10<br>10.2.1.27<br>10.2.1.43 | SNR/Location of End Node with Worst Condition (Node B) | Power = 5<br>Code rate = 1/6 | 7 | 18 | Multicast |

315"

| Group Member / End Node | Node Channel Condition and/or Location Information | Determined Unicast Transmission Characteristics | Estimated Unicast Transmission Cost |
|---|---|---|---|
| 1061" 10.2.1.2 | SNR/Location End NodeA | Power = 4<br>Coderate = 1/3 | 5 |
| 1062" 10.2.1.5 | SNR/Location End NodeB | Power = 5<br>Coderate = 1/6 | 7 |
| 1063" 10.2.1.10 | SNR/Location End NodeC | Power = 1<br>Coderate = 1/2 | 1 |
| 1064" 10.2.1.27 | SNR/Location End NodeD | Power = 5<br>Coderate = 1/3 | 6 |
| 1065" 10.2.1.43 | SNR/Location End NodeE | Power = 3<br>Coderate = 1/3 | 4 |

| Group ID | Group Member List | Worst Node Channel Condition and/or Location Information | Determined Multicast Transmission Characteristics | Estimated MM Tx Cost | Estimated UM Tx Cost | Preferred Multicast Tx Mode |
|---|---|---|---|---|---|---|
| 224.225.1.6 | 10.2.1.2<br>10.2.1.10<br>10.2.1.43 | SNR/Location of End Node with Worst Condition (Node A) | Power = 5<br>Code rate = 1/3 | 6 | 11 | Multicast |
| 224.225.1.9 | 10.2.1.10<br>10.2.1.27<br>10.2.1.43 | SNR/Location of End Node with Worst Condition (Node D) | Power = 5<br>Code rate = 1/3 | 6 | 11 | Multicast |

315'''

| Group Member / End Node | Node Channel Condition and/or Location Information | Determined Unicast Transmission Characteristics | Estimated Unicast Transmission Cost |
|---|---|---|---|
| 10.2.1.2 | SNR/Location End NodeA | Power = 5<br>Coderate = 1/3 | 6 |
| 10.2.1.5 | SNR/Location End NodeB | Power = 5<br>Coderate = 1/6 | 7 |
| 10.2.1.10 | SNR/Location End NodeC | Power = 1<br>Coderate = 1/2 | 1 |
| 10.2.1.27 | SNR/Location End NodeD | Power = 5<br>Coderate = 1/3 | 6 |
| 10.2.1.43 | SNR/Location End NodeE | Power = 3<br>Coderate = 1/3 | 4 |

METHODS AND APPARATUS FOR TRANSMITTING GROUP COMMUNICATION SIGNALS

RELATED APPLICATIONS

This application claims the benefit of U.S. Provisional Patent Application No. 60/601,935, filed Aug. 16, 2004 which is hereby expressly incorporated by reference.

FIELD OF THE INVENTION

This invention relates to communications systems and, more particularly, to methods and apparatus for implementing group communications and/or controlling transmission of group communication signals.

BACKGROUND

In a typical cellular communication network, a set of geographically dispersed base stations provide wireless access to a communications infrastructure. Users with wireless communication devices, or terminals, are able to establish a direct communication link with a suitable base station and then exchange information with other users and/or end systems throughout the communication network.

IP multicast technology provides an efficient packet delivery service for group communications (e.g., one-to-many or many-to-many). The use of IP multicast reduces the bandwidth utilization for group communications. This is especially important for supporting group communications over wireless media, where bandwidth is a scarce resource.

When using IP multicast, a group of recipients is associated with an IP multicast address. A data source addresses and sends a single copy of each IP datagram intended for the group of recipients to the IP multicast group address. The routed network will replicate and forward each datagram as needed to deliver it to the routers interconnecting all of the group members. Specialized IP multicast routing protocols are used to form the delivery trees needed for copying and forwarding multicast datagrams.

IP multicast is a receiver-oriented service, in that receivers join a given multicast group to receive datagrams sent to the corresponding IP multicast group address. End systems and access routers communicate with each other via a group membership protocol, e.g., Internet Group Management Protocol (IGMP), to enable the access router to maintain information on active multicast group membership necessary for building the delivery trees.

BRIEF DESCRIPTION OF THE FIGURES

FIGS. 9, 10, 11 and 12 illustrate exemplary information stored by an access node in accordance with various embodiments of the present invention.

SUMMARY OF THE INVENTION

Figure 1:
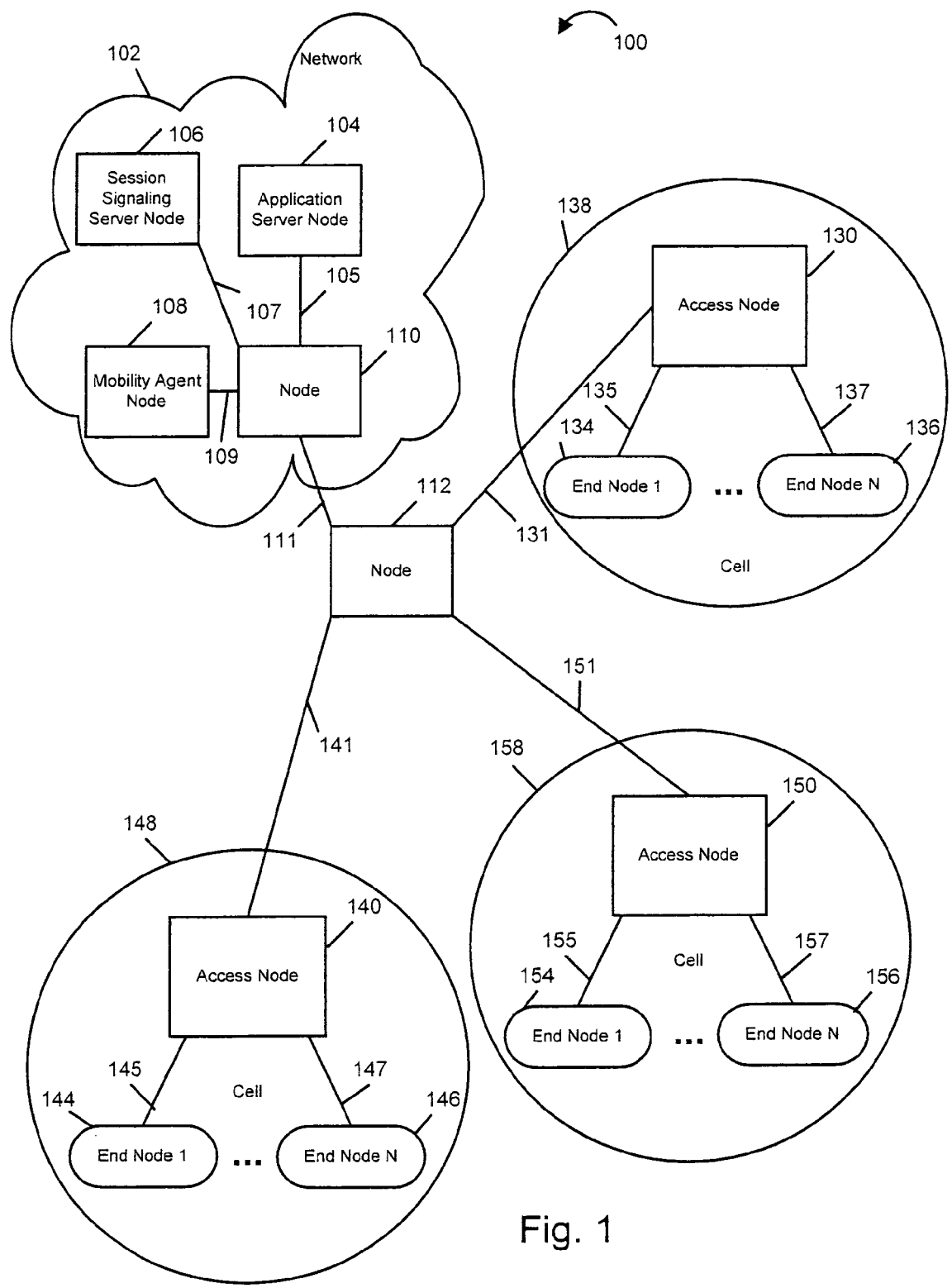
FIG. 1 illustrates a network diagram of an exemplary communications system of the present invention.

The present invention is directed to methods and apparatus for implementing group communications, e.g., multicast communications methods and apparatus. The methods and apparatus of the present invention are particularly well suited for use in wireless communications systems. In such systems different end nodes, which may be wireless terminals used by different individual users, have different communications requirements, e.g., power, timing coding rate, modulation method and/or other signal requirements. These differing signal requirements are often a function of differences in channel conditions and/or end node location which exist between different end nodes and an access node. The conditions, including channel condition and location, can change over time as an end node moves within the coverage area of an access node. Each end node may be a member of zero, one, or more multicast groups at any point in time. Access nodes serve as the end node's point of attachment, e.g., via a wireless communications link, to a communication system, e.g., cellular network. Group membership may vary with time.

Different multicast applications can be executing on different end nodes with each end node being a member of one, multiple or no multicast groups at any point in time. Within an area serviced by a transmitter, e.g., access node's sector or cell transmitter, group membership may change due to actions by the group member(s), e.g., as a user of an end node decides to enter or exit a group, e.g., by signaling a multicast application to make the desired group membership change or by terminating the multicast application. Membership can also change as the result of an end node dynamics, e.g., a mobile node, entering or leaving a cell.

The methods and apparatus of the invention are directed to the subject matter claimed in the present application.

Various features of the present invention are directed to improving resource utilization efficiency, e.g., to reduce the amount of resources required to support multicast applications. Different approaches to achieving this goal are used in different embodiments but the methods are also combined in some embodiments.

In a wireless environment, the amount of resources required to ensure that a wireless terminal will receive a signal from an access node in a reliable manner can vary depending on wireless terminal conditions such as location and/or channel conditions. For example, different coding rates, transmission power, modulation schemes, time slots, number of repeat transmissions due to automatic repeat requests (ARQ) in the case of a wireless terminal failing to receive a signal, etc. may be required to ensure reliable reception for a wireless terminal with poor channel conditions as compared to a wireless terminal with good channel conditions. In accordance with the invention, one or more of these transmission factors can be controlled to satisfy the members of a group being serviced without being concerned for satisfying the requirements of all end nodes that may be in a transmission coverage area. Thus, transmission resources can be conserved by taking the needs of group members into consideration when determining the allocation of transmission resources.

The inventors of the present invention recognized that, unlike in the case of a wired network, different amounts of resources may be required to transmit signals in a reliable manner to different members of a group, e.g., because of the different locations of the group members in a cell, different interference levels and/or because of different device's receive capabilities. In order to be able to reach all members of a group using a single multicast transmission, the multicast transmission should have sufficient power and/or coding protection that it can be reliably received by each member of a group.

While sufficient power and a low enough coding rate could be used to reach all transmission areas served by an access node, such an approach can be extremely wasteful particularly in the case where members of the group have good channel conditions, e.g., are close to the access node's transmitter.

Support for ARQ (automatic repeat request) mechanisms, while possible in a multicast environment, can be complicated and/or difficult to implement in the case of multicast signals directed to multiple users. ARQ is generally easier to implement in the case of unicast transmissions. In addition, power and other transmission resources are often tailored in the case of unicast transmissions to take into consideration a wireless terminal's particular needs and/or channel conditions. In contrast to cases where multicast transmissions are transmitted at a level intended to reach the full coverage area of a sector or cell, a unicast transmission may be much more efficient than a multicast transmission since it is often tailored to the needs of the particular end node to which it is directed.

In accordance with one feature of the present invention, when there are relatively few group members in a cell, multiple unicast transmissions, each directed to a single group member, are used to deliver multicast information. The unicast transmissions, used to implement a multicast, are tailored in terms of allocated resources such as coding rate, transmission power, etc. to the needs of the individual wireless terminal to which the unicast transmission is directed. Thus, during a unicast mode of multicast operation, a packet which is received by an access node with a multicast group identifier may be transmitted over the air link several times, each time the packet being transmitted with a unicast device identifier, e.g., IP address or other identifier corresponding to a specific individual one of the group members. The different transmissions may use different power levels, coding rates and/or modulation schemes which are selected to satisfy the requirements of the individual group member to which the packet is directed and which may be, and often are, different from the requirements that might be required to reach some other group member or node in the cell. In fact, since ARQ (Automatic Repeat Requests) may be supported in unicast mode, when ARQ is supported the power level may be lower and/or the coding rate higher than might be used in multicast transmission modes in which ARQ is not supported. However, the use of ARQ in unicast modes of multicast is not mandatory in accordance with the invention.

When the number of group members increases, e.g., to a level where a single multicast transmission is more efficient than multiple unicast transmission, a switch is made from using multiple unicast transmission to using multicast transmissions is implemented. Switching between the unicast mode of multicast operation and multicast mode of multicast operation may occur repeatedly as membership in a group increases and/or decreases over time or conditions associated with existing group members change.

In some embodiments, ARQ is supported when multiple unicast transmissions are used to achieve a multicast transmission while ARQ is not supported for the multicast transmission. Thus, in some unicast based modes of multicast operation, the present invention supports ARQ but when the switch is made to the multicast mode of multicast operation ARQ support stops.

Thus, in some embodiments, two different modes of multicast operation are supported. The first mode involves separately transmitting information, e.g., packets, which are directed to group members, to each member of the group, e.g., over a wireless communications link. The second mode involves transmitting information, e.g., packets, which are directed to group members by transmitting signals which are directed to a plurality, e.g., the full set, of the group members in the transmitter's coverage area. Thus, in the case of packets received by the access node directed to the group, in the first mode multiple copies of the packet will be made and transmitted to different members of the group. In the case of the second mode, for each received packet, absent ARQ retransmissions, a single or fixed number (e.g., 2 or three) of copies of each packet directed to the group that is received by an access node will be broadcast to the group. This single or fixed number transmission may be at a higher power level and/or coding rate that would be used in the case of unicast transmissions. Signals directed to a plurality of users can be over a multicast communications channel while unicast transmissions may be over a different communications channel. Different multicast communications channels can be used for different communications groups and are normally monitored by multiple members of a group.

In cases where channel conditions and other transmission factors of individual group members are taken into consideration switching between the first and second modes of operation discussed above can be based on a relative system cost of operating in the two different modes given a particular group's membership. In such a case, the mode of operation can be selected based on which approach is likely to be less costly in terms of system costs for a given group.

In some exemplary implementations, where system cost is taken into consideration in selecting the mode of multicast operation, a first cost estimate of a first system cost of delivering information to the members of a group when operating in the first mode of operation is generated. In addition, a second cost estimate which is an estimate of a system of delivering information to the group members when operating the second mode is determined. The particular mode of operating is then determined by comparing the two costs and selecting the mode which has the lower system cost.

In one such system implementation the first cost estimate is a function of at least one transmission characteristic for each of the group members where the first cost estimate is determined by estimating an individual cost of transmitting information to each of the group members and then summing the individual cost estimates to generate an estimate of the cost for delivering the information to the group. Other techniques for generating the first cost estimate are also possible.

In the same exemplary system implementation, the second cost estimate for the group is determined from at least one group transmission characteristic, e.g., a characteristic corresponding to the member of the group with the worst channel conditions.

The first and second cost estimates, for comparison purposes, may be an estimate of the system cost for delivering a fixed number of information bits to the members of the group.

Alternatively, rather than basing the switch between the two modes of operation on cost estimates, a simple rule for switching between the modes can be based on the number of members in a group. A threshold number of members can be used to determine which mode of transmission operation should be used. For example, when the number of group members is below the threshold, the first mode of operation may be selected while for a larger number of group members, the second mode of operation can be selected.

The transmissions implemented by the access node may be OFDM signal transmissions. However, CDMA and other implementations are also supported and possible.

Numerous variations on the above described methods and apparatus of the present invention are possible. The detailed description which follows provides additional description of the invention as well as discussing additional exemplary embodiments, features and benefits of the invention.

DETAILED DESCRIPTION OF THE FIGURES AND THE INVENTION

FIG. 1 illustrates an exemplary communication system 100, e.g., a cellular communication network, which comprises a plurality of nodes interconnected by communications links. Nodes in the exemplary communication system 100 may exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 134, 136, 144, 146, 154, 156, which access the communication system via a plurality of access nodes 130, 140, 150. The end nodes 134, 136, 144, 146, 154, 156 may be, e.g., wireless communication devices or terminals, and the access nodes 130, 140, 150 may be, e.g., wireless access routers or base stations. The exemplary communication system 100 also includes a number of other nodes as may be needed to provide interconnectivity or to provide specific services or functions. Specifically, the exemplary communication system 100 includes a mobility agent node 108, e.g., Mobile IP home agent node, as may be needed to support mobility of end nodes between access nodes, a session signaling server node 106, e.g., Session Initiation Protocol (SIP) proxy server, as may be needed to support establishment and maintenance of communication sessions between end nodes, and an application server node 104, e.g., multimedia server, as may be needed to support specific application layer services.

The FIG. 1 exemplary system 100 depicts a network 102 that includes the application server node 104, the session signaling server node 106, and the mobility agent node 108, each of which is connected to an intermediate network node 110 by a corresponding network link 105, 107, 109, respectively. The intermediate network node 110 in the network 102 also provides interconnectivity to network nodes that are external from the perspective of the network 102 via network link 111. Network link 111 is connected to another intermediate network node 112, which provides further connectivity to a plurality of access nodes 130, 140, 150 via network links 131, 141, 151, respectively.

Each access node 130, 140, 150 is depicted as providing connectivity to a plurality of N end nodes (134, 136), (144, 146), (154, 156), respectively, via corresponding access links (135, 137), (145, 147), (155, 157), respectively. In the exemplary communication system 100, each access node 130, 140, 150 is depicted as using wireless technology, e.g., wireless access links, to provide access. A radio coverage area, e.g., communications cell, 138, 148, 158 of each access node 130, 140, 150, respectively, is illustrated as a circle surrounding the corresponding access node.

The exemplary communication system 100 is subsequently used as a basis for the description of an embodiment of the invention. Alternative embodiments of the invention include various network topologies, where the number and type of network nodes, the number and type of links, and the interconnectivity between nodes may differ from that of the exemplary communication system 100 depicted in FIG. 1.

Figure 2:
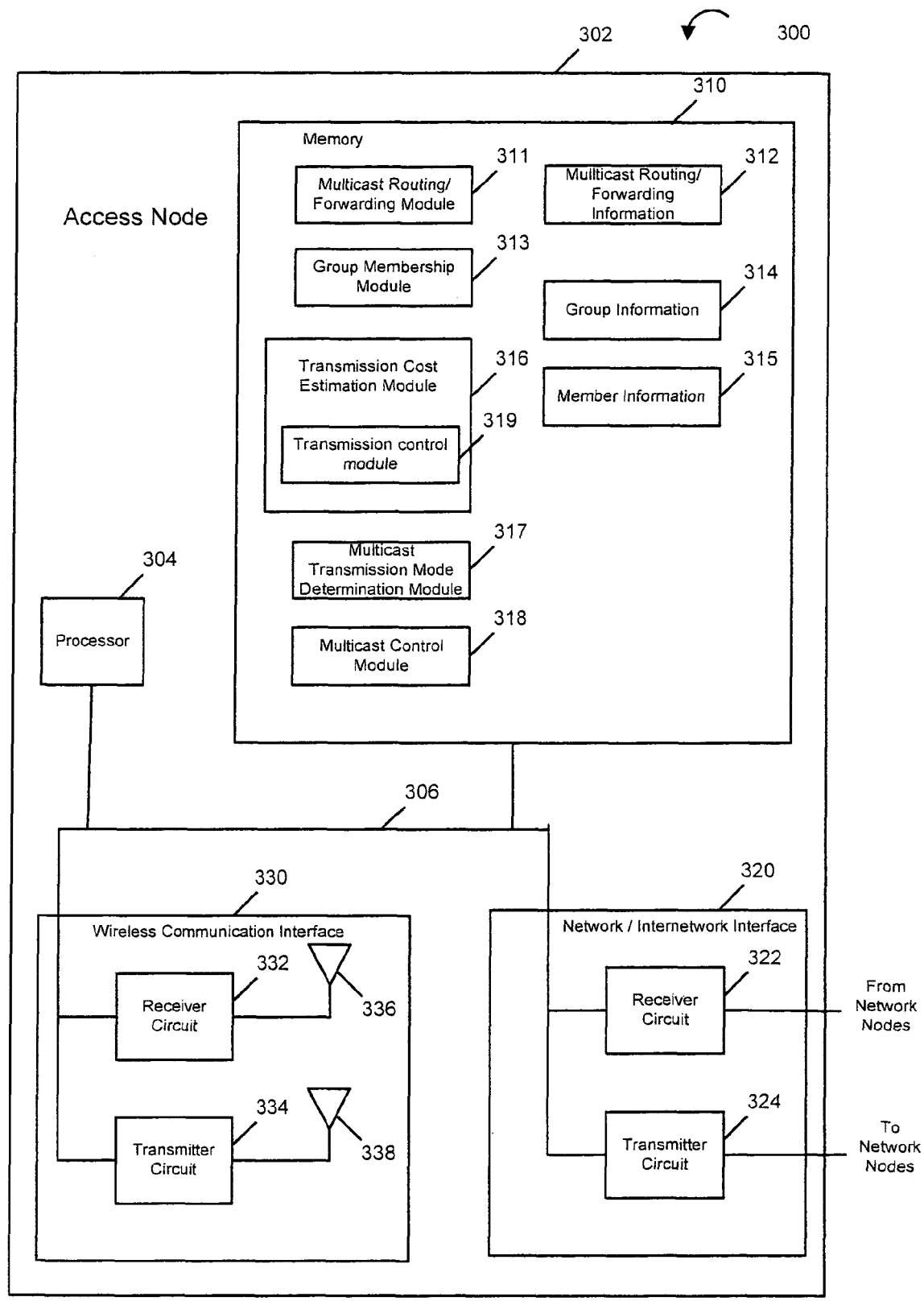
FIG. 2 illustrates an exemplary access node implemented in accordance with the present invention.

FIG. 2 provides a detailed illustration of an exemplary access node 300 implemented in accordance with the present invention. The exemplary access node 300, depicted in FIG. 2, is a detailed representation of an apparatus that may be used as any one of the access nodes 130, 140, 150, depicted in FIG. 1. In the FIG. 2 embodiment, the access node 300 includes a processor 304, a network/internetwork interface 320, a wireless communication interface 330 and memory 310, coupled together by bus 306. Accordingly, via bus 306 the various components of the access node 300 can exchange information, signals and data. The components 304, 306, 310, 320, 330 of the access node 300 are located inside a housing 302.

The processor 304 under control of various modules, e.g., routines, included in memory 310 controls operation of the access node 300 to perform various signaling and processing, as discussed below. The modules included in memory 310 are executed on startup or as called by other modules. Modules may exchange data, information, and signals when executed. Modules may also share data and information when executed.

The network/internetwork interface 320 provides a mechanism by which the internal components of the access node 300 can send and receive signals to/from external devices and network nodes. The network/internetwork interface 320 includes, a receiver circuit 322 and a transmitter circuit 324 used for coupling the node 300 to other network nodes, e.g., via copper wires or fiber optic lines. The wireless communication interface 330 also provides a mechanism by which the internal components of the access node 300 can send and receive signals to/from external devices and network nodes, e.g., end nodes. The wireless communication interface 330 includes, e.g., a receiver circuit 332 with a corresponding receiving antenna 336 and a transmitter circuit 334 with a corresponding transmitting antenna 338 used for coupling the access node 300 to other network nodes, e.g., via wireless communication channels.

In the FIG. 2 embodiment, the memory 310 of the access node 300 includes a multicast routing/forwarding module 311, multicast routing/forwarding information 312, a group membership module 313, group information 314, member information 315, a transmission cost estimation module 316, a multicast transmission mode determination module 317 and a multicast control module 318. Transmission cost estimation module 316 includes a transmission control module 319 for determining at least one of a transmission power level, coding rate and modulation method to be used for transmitting packets to the end nodes which are indicated by said first set of group membership information to be members of said first group, said at least one of a transmission power level and coding rate being determined as a function of information relating to a condition associated with at least one group member. Various modulations methods which may be selected include, e.g., QPSK, QAM 16, QAM 64, etc. The transmission control module includes logic, circuits and/or sub-modules for adjusting the determined transmission power level, coding rate and/or modulation method in response to changes in channel condition information, as a channel condition associated with the end node in said first group having the worst channel conditions changes over time.

The multicast routing/forwarding module 311 controls the operation of the access node 300 to support routing/forwarding of multicast traffic packets. The multicast routing/forwarding module 311 may use any one of a variety of multicast routing protocols, e.g., Distance Vector Multicast Routing Protocol (DVMRP), Protocol Independent Multicast (PIM), etc. The multicast routing/forwarding information 312 includes, e.g., the multicast routing and/or forwarding tables indicating the interfaces between which multicast packets corresponding to specific groups should be copied and forwarded. The group membership module 313 controls the operation of the access node 300 to support managing group membership information on interfaces of the access node 300. The group information 314 includes, e.g., the set of groups for which there are active members connected to the access node 300 via the wireless interface 330 and specific information pertaining to each such group. The member information 315 includes, e.g., specific information pertaining to each group member connected to the access node 300 via the wireless interface 330. Both the group information 314 and member information 315 are more fully described subsequently.

The transmission cost estimation module 316 computes a cost estimate corresponding to the transmission of multicast information (e.g., packets or a fixed number of information bits) to one or more members in a group. In some embodiments of the invention the estimated cost is a function of one or more determined transmission characteristics, e.g., power, bandwidth, time, code rate. In some embodiments of the invention, the determined transmission characteristics are a function of the channel condition and or channel variation (e.g., signal to noise ratio, error rate). In accordance with some embodiments, information used for cost estimation as well as the results are included in the group information 314 and member information 315 stores.

The multicast transmission mode determination module 317 determines the preferred mode for transmission of multicast information (e.g., packets) for a particular multicast group. In some embodiments, the preferred multicast packet transmission mode is determined based on the number of group members. For example, if the number of group members is less than or equal to some threshold N, a separate copy of each multicast packet is transmitted to each group member, while if the number of group members is greater than the threshold N, a single copy of each multicast packet is transmitted to the set of group member. In some embodiments, the preferred multicast packet transmission mode is determined based on the relative estimated costs for transmitting information separately to each member (e.g., unicast directed transmissions) versus transmitting information simultaneously to the set of group members (e.g., multicast directed transmissions). In accordance with some embodiments, information used for multicast transmission mode determination as well as the results are included in the group information 314 and member information 315 stores.

The multicast control module 318 controls the overall operation of the access node 300 to support adaptively controlling the mode and/or characteristics of transmitting multicast information (e.g., packets) via the wireless interface 330.

Thus, the multicast control module 318 exchanges signals and/or information with other modules included in memory 310, e.g., group information 314, member information 315, transmission cost estimation module 316, and multicast transmission mode determination module 317. The multicast control module 318 implements switching between modes of operation, transmission power levels, modulation methods and coding rates based on determinations and/or information provided by the various other modules including the transmission control module 319 and multicast transmission mode determination module 317.

Figure 3:
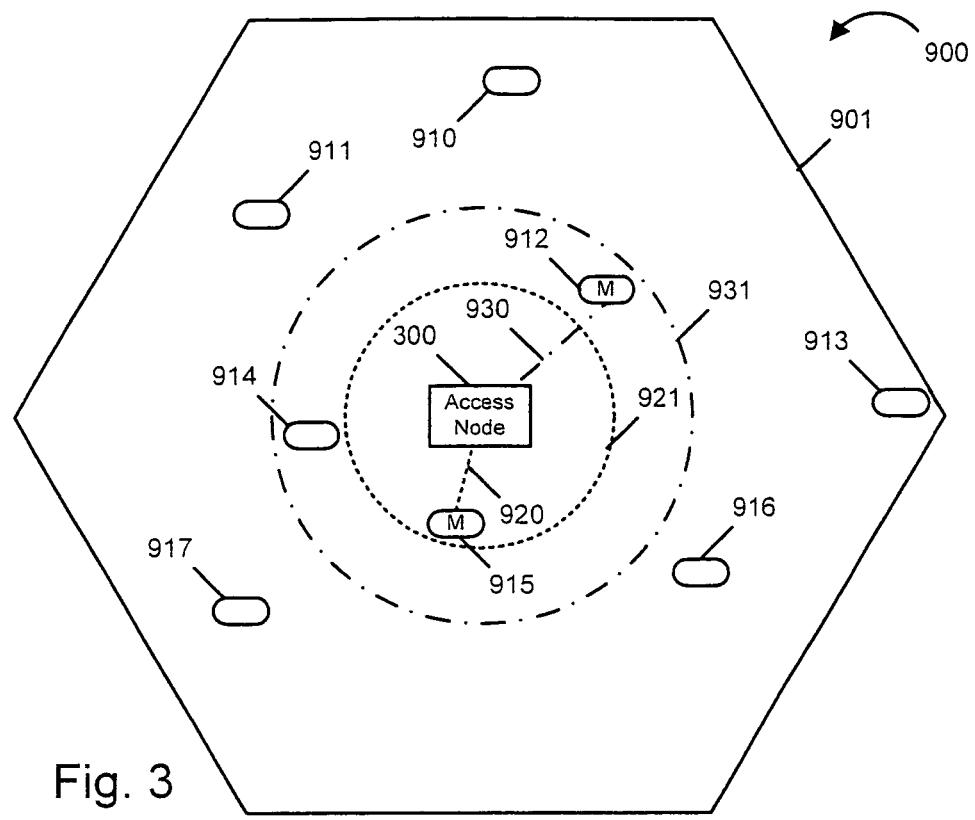
FIG. 3 illustrates transmission of a separate copy of a multicast packet to each member in a group in accordance with the present invention.
Figure 4:
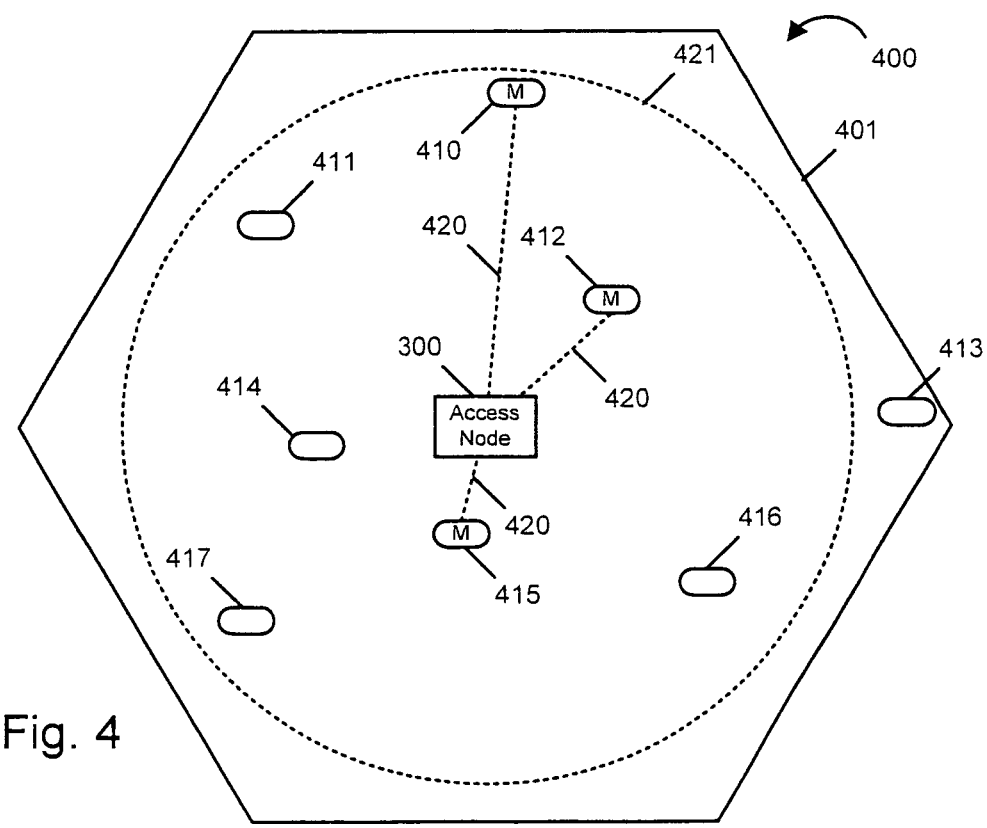
FIG. 4 illustrates transmission of a copy of a multicast packet to a plurality of members in a group in accordance with the present invention.

FIGS. 3 and 4 illustrate transmission of a multicast packet from an access node 300 implemented in accordance with the invention during two different modes of operation. FIG. 3 illustrates a scenario 900 where the access node 300 transmits a separate copy of each multicast packet to each group member using individually allocated transmission resources, while FIG. 4 illustrates a scenario 400 where the access node 300 transmits a single copy of each multicast packet to the set of group members using shared transmission resources. The transmission resources may include a transmission unit, said transmission unit being, e.g., one of a frame and a time slot. The transmission resources may also include other things such as segments and spreading codes. Determination of the preferred mode for transmission of multicast packets is a function of the set of group members (e.g., the number of group members) and/or the specific information associated with each group member (e.g., channel condition and/or channel variation).

FIG. 3 depicts an access node 300 and a plurality of end nodes (ENs) (910, 911, 912, 913, 914, 915, 916, 917) within the radio coverage area 901 of the access node 300. A first end node 912 and a second end node 915 are each marked with an M to indicate that they are members of a particular multicast group. The dotted-dashed line 930 between the access node 300 and the first end node 912 represents transmission of a copy of a multicast packet to said first end node 912. A corresponding dotted-dashed circle 931 represents the characteristics (e.g., power and code rate) of the transmission directed to said first end node 912. The dashed line 920 between the access node 300 and the second end node 915 represents transmission of a separate copy of the same multicast packet to said second end node 915. A corresponding dashed circle 921 represents the characteristics (e.g., power and code rate) of the transmission directed to said second end node 915. The transmissions to the first end node 912 and the second end node 915 may occur either simultaneously or at different points in time, but in either case they are separate transmissions using transmission resources specifically assigned, allocated, or associated with the respective end nodes.

FIG. 4 depicts an access node 300 and a plurality of end nodes (410, 411, 412, 413, 414, 415, 416, 417) within the radio coverage area 401 of the access node 300. A first end node 410, a second end node 412, and a third end node 415 are each marked with an M to indicate that they are members of a particular multicast group. The dashed lines 420 between the access node 300 and the group of end node 410, 412, 415 represent transmission of a multicast packet to the group of end node 410, 412, 415. A corresponding dashed circle 421 represents the characteristics (e.g., power and code rate) of the transmission directed to said group of end node 410, 412,

415. Transmission of the multicast packet to the group of end nodes 410, 412, 415 uses shared transmission resources that are monitored by the individual end nodes 410, 412, 415 in parallel. The shared transmission resources may include a transmission unit, transmission segment, spreading code and/ or other transmission resources of the type described above.

Figure 5:
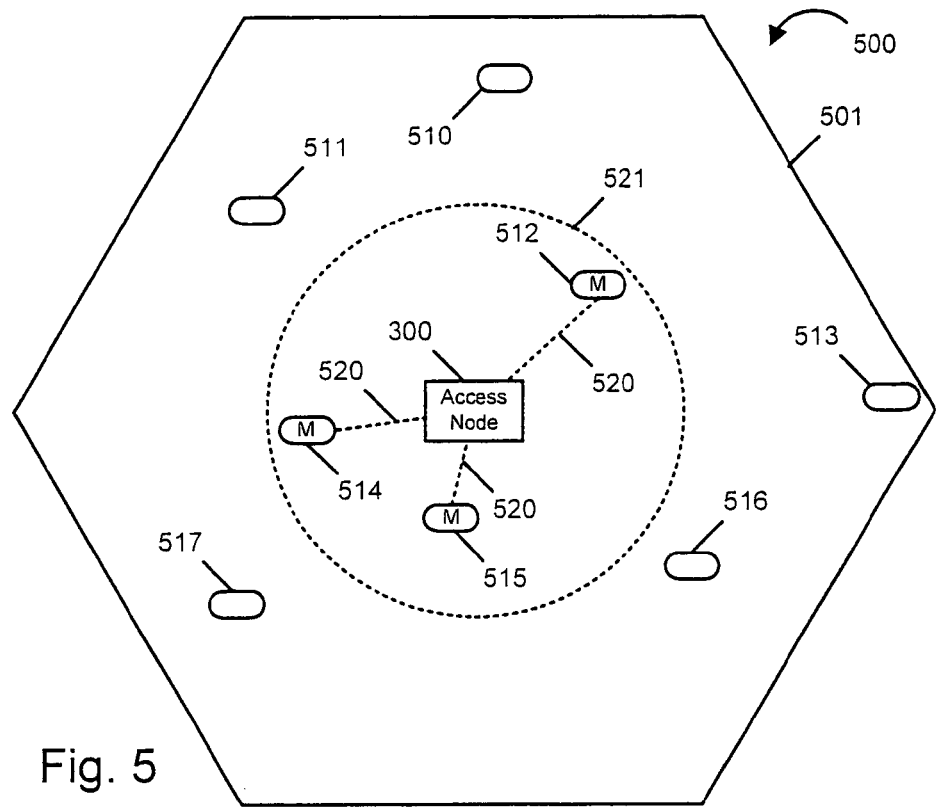
FIG. 5 illustrate transmission of a copy of a multicast packet to a plurality of members in a group using a first set of transmission characteristics to enable reception by the set of receivers in the group in accordance with the present invention.
Figure 6:
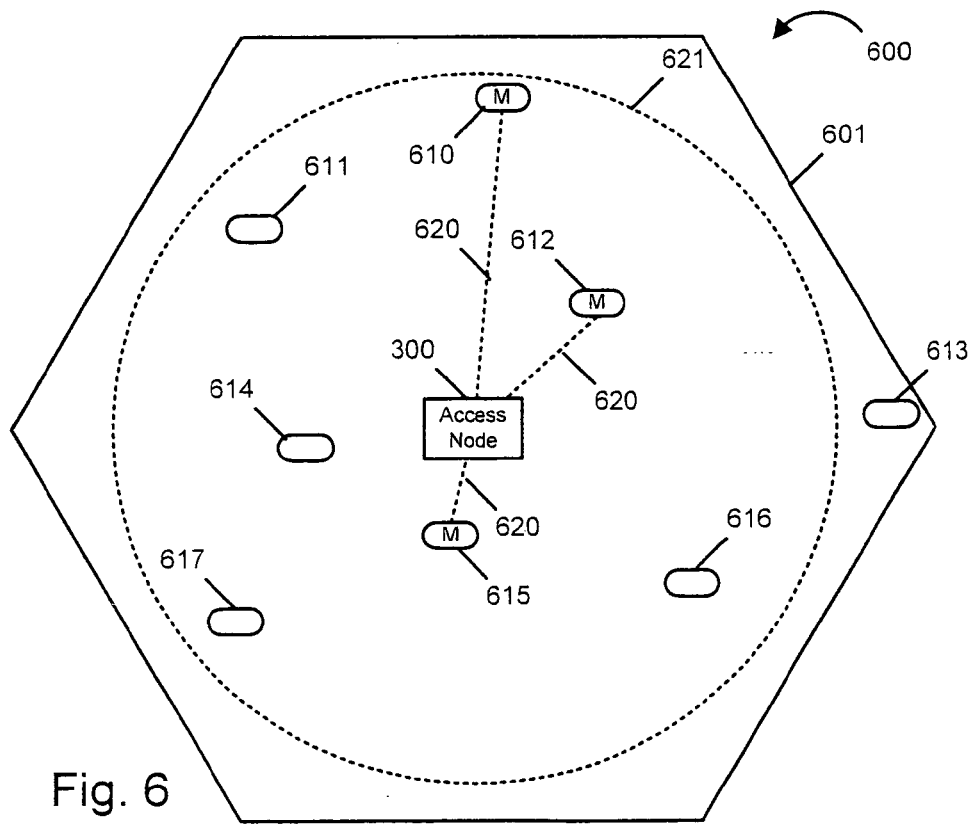
FIG. 6 illustrate transmission of a copy of a multicast packet to a plurality of members in a group using a second set of transmission characteristics to enable reception by the set of receivers in the group in accordance with the present invention.

FIGS. 5 and 6 illustrate transmission of a multicast packet during the second mode of operation (e.g., the mode illustrated in FIG. 4) from an access node 300 implemented in accordance with the invention using two different sets of transmission characteristics. FIG. 5 illustrates a scenario 500 where the access node 300 transmits single copy of each multicast packet to the set of group members using shared transmission resources and a first set of transmission characteristics (e.g., power and code rate), while FIG. 6 illustrates a scenario 600 where the access node 300 transmits a single copy of each multicast packet to the set of group members using shared transmission resources and a second set of transmission characteristics (e.g., power and code rate). Determination of the transmission characteristics is a function of the set of group members (e.g., the number of group members) and/or the specific information associated with each group member (e.g., channel condition and/or channel variation). Changes in group membership, e.g., adding or deleting end nodes from a group, or changes in conditions corresponding to an end node which is a group member such as channel conditions and/or channel variations may trigger transition from transmitting as shown in FIG. 5 to transmitting as shown in FIG. 6. The location of the end node, e.g., mobile node, 610 within the cell and the channel condition to the end node 610 are both conditions which correspond to the end node 610. In FIG. 6 the channel corresponding to the end node identified by reference 610 is likely to be worse than the worst channel to a group member in FIG. 5 since node 610 is further away from the base station 300 than any of the group members in the FIG. 5 example.

FIG. 5 depicts an access node 300 and a plurality of end nodes (510, 511, 512, 513, 514, 515, 516, 517) within the radio coverage area 501 of the access node 300. A first end node 512, a second end node 514, and a third end node 515 are each marked with an M to indicate that they are members of a particular multicast group. The dashed lines 520 between the access node 300 and the group of end nodes 512, 514, 515 represent transmission of a multicast packet to the group of end nodes 512, 514, 515. A corresponding dashed circle 521 represents the characteristics (e.g., power and code rate) of the transmission directed to said group of end nodes 512, 514, 515. Transmission of the multicast packet to the group of end nodes 512, 514, 515 uses shared transmission resources that are monitored by the individual end nodes 512, 514, 515 in parallel. The dashed circle 521 is shown to minimally encompass said group of end nodes 512, 514, 515 to indicate the transmission characteristics are determined to efficiently transmit the multicast packet to the group of end nodes 512, 514, 515, e.g., using minimum power, bandwidth, and/or time needed to reliably transmit the multicast packet to the group members.

FIG. 6 depicts an access node 300 and a plurality of end nodes (610, 611, 612, 613, 614, 615, 616, 617) within the radio coverage area 601 of the access node 300. A first end node 610, a second end node 612, and a third end node 615 are each marked with an M to indicate that they are members of a particular multicast group. The dashed lines 620 between the access node 300 and the group of end nodes 610, 612, 615 represent transmission of a multicast packet to the group of end nodes 610, 612, 615. A corresponding dashed circle 621 represents the characteristics (e.g., power and code rate) of the transmission directed to said group of end nodes 610, 612, 615. Transmission of the multicast packet to the group of end nodes 610, 612, 615 uses shared transmission resources that are monitored by the individual end nodes 610, 612, 615 in parallel. The dashed circle 621 is shown to minimally encompass said group of end nodes 610, 612, 615 to indicate the transmission characteristics are determined to efficiently transmit the multicast packet to the group of end nodes 610, 612, 615, e.g., using minimum power, bandwidth, and/or time needed to reliably transmit the multicast packet to the group members. The dashed circle 621 in FIG. 6 is depicted with a larger radius than the dashed circle 521 in FIG. 5 to indicate that the transmission characteristics are different (e.g., 621 may corresponded to a higher power transmission than 521).

Figure 7:
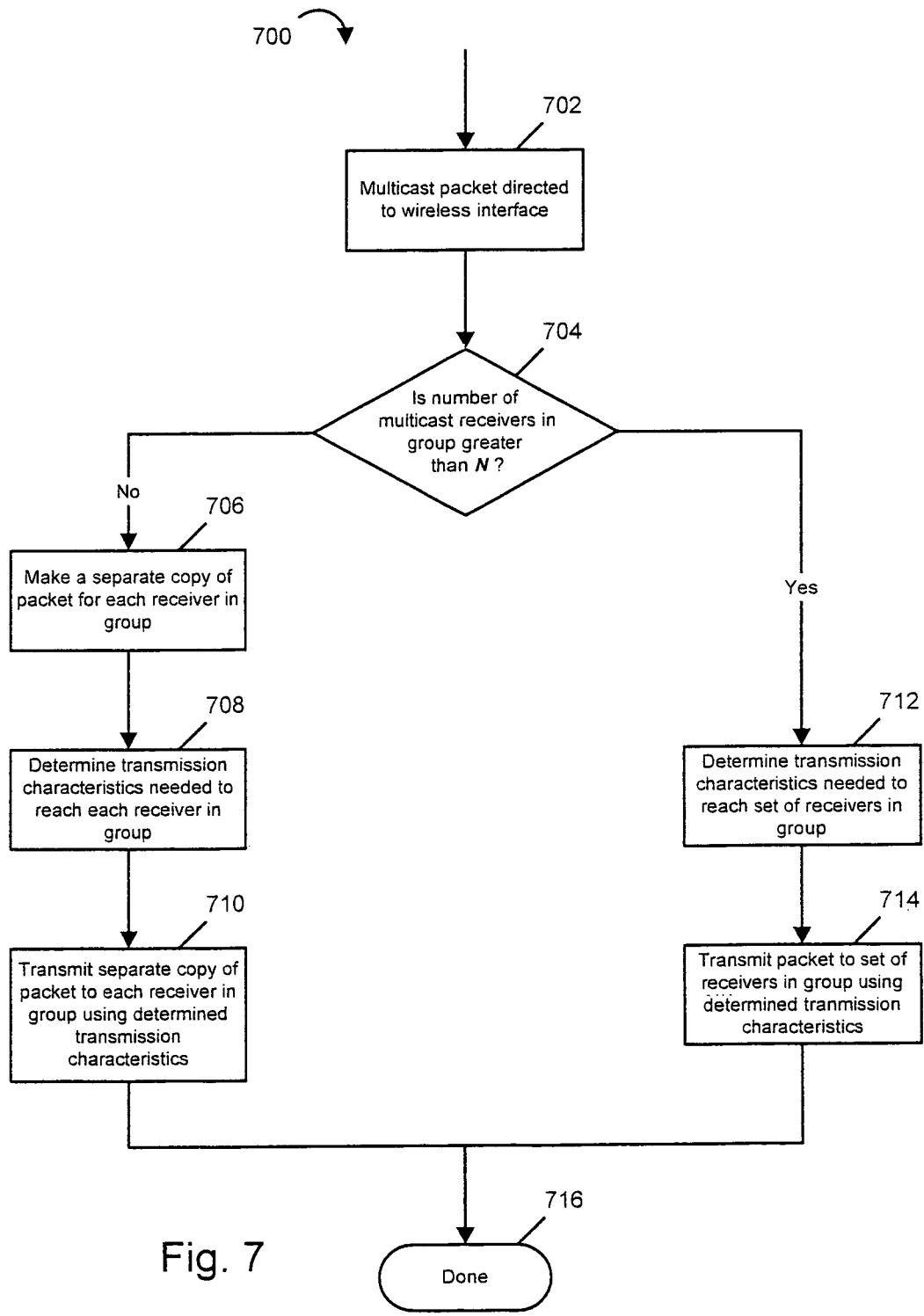
FIG. 7 illustrates a flowchart that shows an exemplary procedure to adaptively control the mode and characteristics of transmitting multicast packets in accordance with the present invention.

FIG. 7 illustrates a flowchart 700 defining an exemplary procedure used in some embodiments of the present invention to adaptively control the transmission of multicast packets, via the wireless interface 330 of an access node 300 implemented in accordance with the invention. The procedure is executed for each multicast packet directed to the wireless interface for transmission to a set of group members associated with the wireless interface. The first step 702 of the procedure corresponds to the event of a multicast packet being directed to the wireless interface for transmission to a set of group members associated with the wireless interface. In the second step 704, a determination is made as to whether the number of group members is greater than a pre-determined threshold N.

If the number of group members does not exceed the pre-determined threshold N, a separate copy of the multicast packet is transmitted to each group member, steps 706, 708, 710. Thus, in step 706 a separate copy of the multicast packet is made for each member of the group, in step 708 transmission characteristics for sending a copy to each member of the group are determined, and in step 710 the individual copies are separately transmitted to each group member using transmission resources specifically assigned, allocated, or associated with each group member.

Alternatively, if the number of group members does exceed the pre-determined threshold N, a single copy is transmitted to the set of members in the group, steps 712, 714. Thus, in step 712 transmission characteristics for sending a copy to the set of members in the group are determined, and in step 714 a copy of the multicast packet is transmitted to the set of members in the group using shared transmission resources that are monitored by each group member. In either case, processing ends in step 716.

Figure 8:
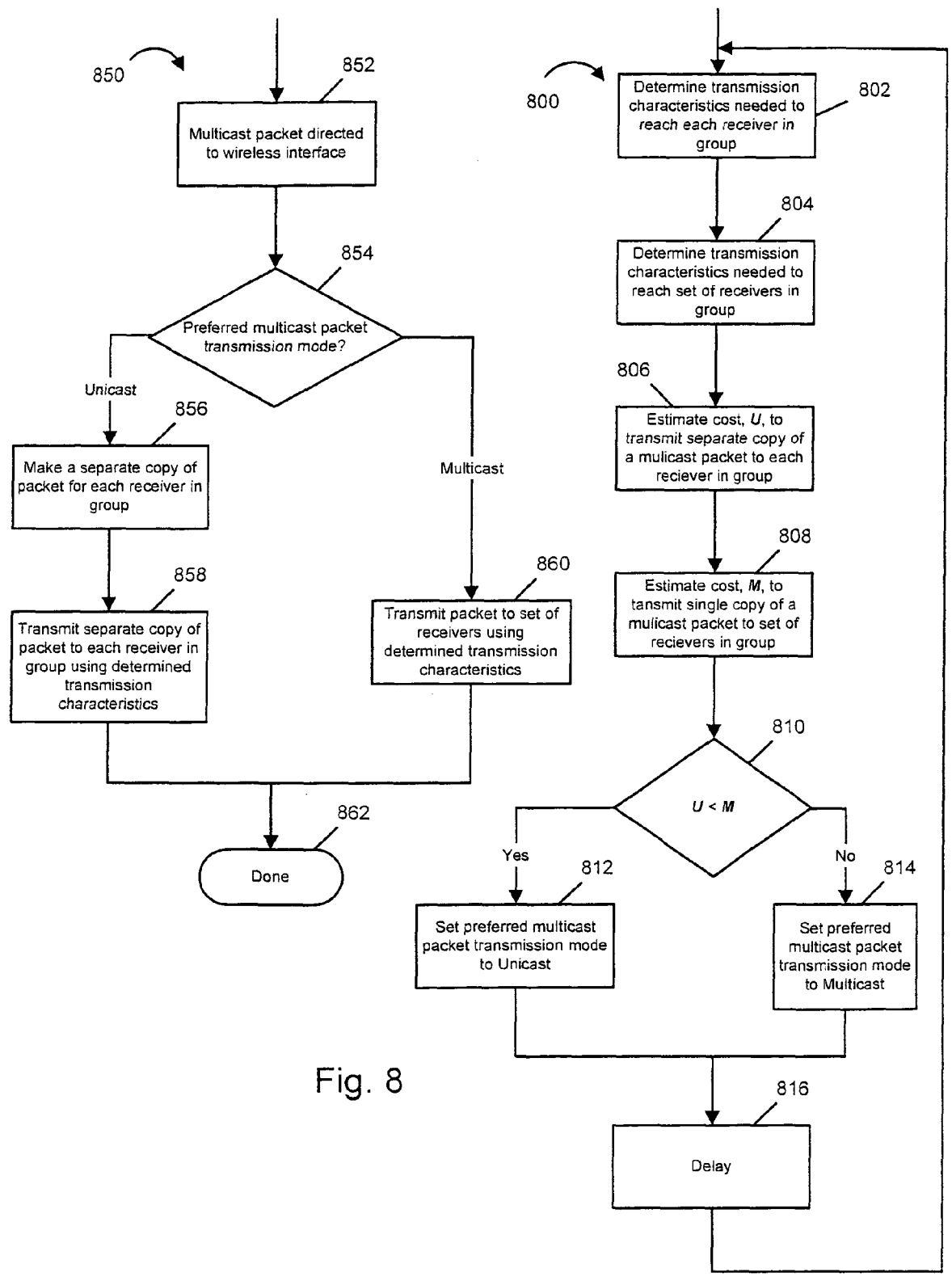
FIG. 8 illustrates flowcharts that show exemplary procedures to adaptively determine the preferred mode and characteristics of transmitting multicast packets and to transmit multicast packets based on the determined mode and characteristics in accordance with the present invention.

FIG. 8 illustrates a first flowchart 800 defining an exemplary procedure used in some embodiments of the present invention to adaptively determine a preferred multicast packet transmission mode for multicast packets corresponding to a particular group that are directed for transmission via the wireless interface 330 of an access node 300 implemented in accordance with the invention. FIG. 8 also illustrates a second flowchart 850 defining an exemplary procedure used in some embodiments of the present invention to adaptively control the transmission of multicast packets, via the wireless interface 330 of an access node 300 implemented in accordance with the invention, based on the preferred multicast packet transmission mode, e.g., as determined by the procedure defined by said first flowchart 800 in FIG. 8.

The procedure defined by the first flowchart 800 in FIG. 8 executes repeatedly for a particular multicast group (e.g., as a background process) irrespective of multicast packet arrivals for said group. The first step 802 determines the transmission characteristics (e.g., power, code rate) for separately transmitting information to each member in the group (e.g., as a function of individual member channel condition and variation). The next step 804 determines the transmission characteristics (e.g., power, code rate) for transmitting information to the set of members in the group using shared transmission resources (e.g., as a function of group channel condition and variation). The next step 806 estimates the cost U of separately transmitting the same information to each member in the group (e.g., as a function of the transmission characteristics associated with each member determined in step 802). The next step 808 estimates the cost M of transmitting information to the set of members in the group using shared transmission resources (e.g., as a function of the transmission characteristics determined in step 804).

In step 810, the estimated costs, U and M, corresponding to the two modes of operation, are compared. If the estimated cost U is less than the estimated cost M, then the preferred multicast packet transmission mode is set to Unicast in step 812, otherwise the preferred multicast packet transmission mode is set to Multicast in step 814. Step 816 optionally adds a delay, before returning to step 802 and repeating the procedure, to control the frequency of the computations.

The procedure defined by the second flowchart 850 in FIG. 8 is executed for each multicast packet directed to the wireless interface for transmission to a set of group members associated with the wireless interface. The first step 852 of the procedure corresponds to the event of a multicast packet being directed to the wireless interface for transmission to a set of group members associated with the wireless interface. In the second step 854, a determination is made as to whether the preferred multicast packet transmission mode (e.g., as set by the procedure defined by the first flowchart 800 in FIG. 8) is presently set to Unicast or Multicast.

If the preferred multicast packet transmission mode is Unicast, a separate copy of the multicast packet is transmitted to each group member, steps 856, 858. Thus, in step 856 a separate copy of the multicast packet is made for each member of the group and in step 858 the individual copies are separately transmitted to each group member using transmission resources specifically assigned, allocated, or associated with each group member and using transmission characteristics as determined during the last execution of step 802.

Alternatively, if the preferred multicast packet transmission mode is Multicast, a single copy is transmitted to the set of members in the group, step 860. Thus, in step 860 a copy of the multicast packet is transmitted to set of members in the group using shared transmission resources that are monitored by each group member and using transmission characteristics as determined during the last execution of step 804. In either case, processing ends in step 862.

FIG. 9 illustrates exemplary group information 314 and exemplary member information 315 (both in tabular form) that may be stored in memory 310 of an access node 300 implemented in accordance with the invention. The group information 314 table includes columns (a) 1001 identifying a group, (b) 1002 identifying the end nodes that are members of the group, (c) 1006 the channel condition and/or location information corresponding to the end node in the group to which the row corresponds having the worst channel conditions and/or which is located furthest away from the access node, (d) 1003 indicating the determined transmission characteristics for transmitting information using shared resources to the set of members in the group, (e) 1004 indicating the estimated cost for transmitting information using shared resources to the set of members in the group, (f) indicating the estimated cost for separately transmitting information to each member of the group using individually allocated resources, and (g) 1005 indicating the preferred multicast transmission mode for the group. The group information 314 may be, and in some embodiments is, updated from time to time, e.g., as changes in group membership, channel conditions and/or location occur. Portions of the information show in table 314 may be, and in some embodiments is, stored elsewhere in memory. Each row 1021, 1022 of the group information 314 table, represents the information associated with a particular multicast group. Exemplary information is presented for two multicast groups. The first group (224.225.1.6) includes two members (10.2.1.2 and 10.2.1.10) and indicates that the preferred multicast packet transmission mode is Unicast. The second group (224.225.1.9) includes four members (10.2.1.5, 10.2.1.10, 10.2.1.27, and 10.2.1.43) and indicates that the preferred multicast packet transmission mode is Multicast. Note that in column 1003 the power and coding rate for the group is selected to correspond to the coding rate/power level combination needed to reach the end node in the group with the worst channel conditions. This will normally correspond to a lower power level and a higher coding rate than that which would be required to reach all areas of the transmission coverage region. This is particularly beneficial in terms of conserving resources when group members are located well within the boundary of the transmission coverage region. In some embodiments of the present invention, the coding rate may be lower and/or the power level used may be higher for the group than the minimum required to reach the end node in the group with the worst channel conditions, e.g., to improve robustness of in the absence of ARQ.

In the exemplary group information 314 table, the estimated multicast mode transmission cost in column 1004 may be, and in some embodiments is, a function of the determined multicast transmission characteristics in column 1003. Note however, that the estimated unicast mode transmission cost in column 1007 of the group information 314 table may be, and in some embodiments is, a function of the individual estimated unicast transmission cost corresponding to each group member listed in column 1002, where the individual estimated unicast transmission cost corresponding to each group member is shown in column 1053 of the member information 315 table. For each group, e.g., row, the preferred multicast transmission mode in column 1005 is set to Multicast if the estimated multicast mode transmission cost in column 1004 is lower than the estimated unicast mode transmission cost in column 1007, and is set to Unicast otherwise. Note that alternative cost estimation and mode determination functions are used in various embodiments of the present invention.

The member information 315 table includes columns (a) 1051 identifying a group member/end node, (b) 1055 channel condition and/or location information for the individual end node, (c) 1052 indicating the determined transmission characteristics for separately transmitting information to the end node, and (d) 1053 indicating the estimated cost for separately transmitting information to the end node. Each row (1061, 1062, 1063, 1064, 1065) of the member information 315 table, represents the information associated with a particular end node (A, B, C, D or E). The member information 315 may be, and in some embodiments is, updated as the conditions/location corresponding to the end node changes. Note that an end node may be a member of multiple groups, but need not be listed in the member table more than once. For example, end node 10.2.1.10 (row 1063 of the member information 315 table) is indicated as a member of group 224.225.1.6 (row 1021 and column 1002 of the group information 314 table) and group 224.225.1.9 (row 1022 and column 1002 of the group information 314 table).

FIG. 10 illustrates exemplary group information 314' and exemplary member information 315' as may be stored in memory 310 of an access node at a second point in time (e.g., a time other than the time at which the information shown in FIG. 9 is stored). The group information and 314' and member information 315' are shown with the same rows and columns, but the row/column reference numbers have been augmented with a prime symbol, ', to indicate that the information corresponding to a particular row/column may be different at said second point in time. The group information 314' shown in FIG. 10, indicates that end node 10.2.1.43 is a member of the first group 224.225.1.6 (see row 1021' and column 1002'), where said end node is not shown as a member in FIG. 9 (see row 1021 and column 1002). Correspondingly, the group information 314' table in FIG. 10 indicates that the estimated unicast transmission cost (row 1021' and column 1007') is higher than that shown in FIG. 9 (see row 1021 and column 1007), and that the preferred multicast transmission mode is set to Multicast (see row 1021' and column 1005').

FIG. 11 illustrates exemplary group information 314" and exemplary member information 315" comparable to that shown in FIG. 10, but wherein the determined multicast transmission characteristics 1003" and estimated multicast mode transmission costs in column 1004" are computed differently. In particular, in accordance with the FIG. 11 example, for a particular group, e.g., row of the group information 314" table, the determined multicast transmission characteristics in column 1003" are set equal to the determined unicast transmission characteristics of the worst node in the group, where the worst node is indicated in column 1006" and the corresponding unicast transmission characteristics is indicated in column 1052" of the member information 315" table. Similarly, the estimated multicast mode transmission cost in column 1004" is set equal to the estimated unicast transmission cost corresponding to the worst node, where the worst node is indicated in column 1006" and the corresponding estimated unicast transmission cost is indicated in column 1053" of the member information 315" table.

FIG. 12 illustrates exemplary group information 314''' and exemplary member information 315''' based on the same computations as used in FIG. 11, but as may be stored in memory 310 of an access node at a second point in time (e.g., a time other than the time at which the information shown in FIG. 11 is stored). In accordance with the FIG. 12 example, changes are indicated for both groups 224.225.1.6, row 1021''', and 224.225.1.9, row 1022'''.

For group 224.225.1.6, row 1021''', note that there are changes to the determined multicast transmission characteristics in column 1003''', the estimated multicast mode transmission cost in column 1004''', and the estimated unicast mode transmission cost in column 1007''', as compared to the same row/columns in FIG. 11. Each of these changes corresponds to changes related to the group member 10.2.1.2 identified as the worst node, node A. With respect to this member, changes in channel conditions and/or location affect the unicast transmission characteristics resulting in higher power requirement and higher cost than in the case of the FIG. 11 example. This change results higher power requirement and costs for the group than in the case of the FIG. 11 example, despite the fact that the membership of the group 224.225.1.9 remains the same from the time of the FIG. 11 example to the time of the FIG. 12 example.

For group 224.225.1.9, row 1022''', note that there are changes to group membership in column 1002''' and other columns, as compared to the same row/columns in FIG. 11. The group information 314''' indicates that end node 10.2.1.5 is not a member of the second group 224.225.1.9 (see row 1022''' and column 1002'''). Correspondingly, the worst node indicated in column 1006''' is different than in the case of FIG. 11 example and that the determined multicast transmission characteristics in column 1003''', the estimated multicast mode transmission cost in column 1004''', and the estimated unicast mode transmission cost in column 1007''' have all been changed accordingly, as compared to the same row/columns in FIG. 11.

Thus, FIG. 12 when compared to FIG. 11, shows that changes in group membership and/or conditions corresponding to a member of a group which has the same group membership, can trigger changes in the allocation of transmission resources such as power, and coding rate. The same changes could, and in some embodiments do, result in changes in the modulation method selected to be used.

In some embodiments of the present invention, communications between nodes is based all, or in part, on the Internet Protocol (IP). Thus, communication of both data and/or control signaling between the network nodes may use IP packets, e.g., datagrams.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with code division multiple access (CDMA), orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating an access node, comprising:
storing group membership information indicating a set of group members associated with a wireless interface of said access node;
receiving multicast packets;
selecting for each received multicast packet, by a base station or wireless access router acting as a point of attachment for the group members to the access node, a first mode of multicast packet delivery based only on a number of group members in said set of group members being less than or equal to a predetermined number, said first mode of multicast packet delivery being a mode in which a separate copy of the multicast packet is transmitted to each group member in said set of group members; and selecting for each received multicast packet, by the base station or wireless access router of the access node, a second mode of multicast packet delivery based only on the number of group members in said set of group members being greater than said predetermined number, the second mode of multicast packet delivery being a mode in which a single copy of the multicast packet is transmitted to said set of group members, wherein the group membership information further comprises a cost estimate for transmitting a separate copy of the multicast packet to each group member in said set of group members or a cost estimate for transmitting a single copy of the multicast packet to said set of group members.

2. The method of claim 1, further comprising:
when said first mode of multicast packet delivery is selected, determining transmission characteristics needed to reach each group member in said set; and
transmitting a separate copy of the multicast packet to each group member in the set using transmission resources specifically assigned to each individual group member.

3. The method of claim 1, further comprising:
when said second mode of multicast packet delivery is selected, transmitting the single copy of the multicast packet to the group members in said set using shared transmission resources that are monitored by each group member in said set.

4. The method of claim 1, further comprising determining the number of members in said set of group members.

5. The method of claim 4, further comprising comparing the number of members in said set of group members to said predetermined number.

6. A base station or wireless access router apparatus acting as a point of attachment for group members to an access node, comprising:
memory including stored group membership information indicating a set of group members associated with a wireless interface of said access node;
a receiver for receiving multicast packets; and
a multicast transmission mode determination module for:
selecting for each received multicast packet a first mode of multicast packet delivery based only on a number of group members in said set of group members being less than or equal to a predetermined number, said first mode of multicast packet delivery being a mode in which a separate copy of the multicast packet is transmitted to each group member in said set of group members; and
selecting for each received multicast packet a second mode of multicast packet delivery based only on the number of group members in said set of group members being greater than said predetermined number, the second mode of multicast packet delivery being a mode in which a single copy of the multicast packet is transmitted to said set of group members, wherein the group membership information further comprises a cost estimate for transmitting a separate copy of the multicast packet to each group member in said set of group members or a cost estimate for transmitting a single copy of the multicast packet to said set of group members.

7. The apparatus of claim 6, further comprising:
a transmission control module for determining transmission characteristics needed to reach each group member in said set; and
a transmission module for transmitting a separate copy of the multicast packet to each group member in the set using transmission resources specifically assigned to each individual group member when said first mode of multicast packet delivery is selected.

8. The apparatus of claim 7, wherein said transmission module is configure to:
transmit the single copy of the multicast packet to the group members in said set using shared transmission resources that are monitored by each group member in said set when said second mode of multicast packet deli very is selected.

9. The apparatus of claim 6, wherein said multicast transmission mode determination module is configured for determining the number of members in said set of group members.

10. The apparatus of claim 9, wherein said multicast transmission mode determination module is configured for comparing the number of members in said set of group members to said predetermined number.

11. A base station or wireless access router apparatus acting as a point of attachment for group members to an access node, comprising:
means for storing group membership information indicating a set of group members associated with a wireless interface of said access node;
means for receiving multicast packets;
means for selecting for each received multicast packet a first mode of multicast packet delivery based only on a number of group members in said set of group members being less than or equal to a predetermined number, said first mode of multicast packet delivery being a mode in which a separate copy of the multicast packet is transmitted to each group member in said set of group members; and
means for selecting for each received multicast packet a second mode of multicast packet delivery based only on the number of group members in said set of group members being greater than said predetermined number, the second mode of multicast packet delivery being a mode in which a single copy of the multicast packet is transmitted to said set of group members, wherein the group membership information further comprises a cost estimate for transmitting a separate copy of the multicast packet to each group member in said set of group members or a cost estimate for transmitting a single copy of the multicast packet to said set of group members.

12. The apparatus of claim 11, further comprising:
means for determining transmission characteristics need to reach each group member in said set; and
means for transmitting a separate copy of the multicast packet to each group member in the set using transmission resources specifically assigned to each individual group member when said first mode of multicast packet delivery is selected.

13. The apparatus of claim 12, wherein said means for transmitting is also for transmitting the single copy of the multicast packet to the group members in said set using shared transmission resources that are monitored by each group member in said set when said second mode of multicast packet delivery is selected.

14. The apparatus of claim 11, further comprising means for determining the number of members in said set of group members.

15. The apparatus of claim 14, further comprising means for comparing the number of members in said set of group members to said predetermined number.

16. A non-transitory computer readable medium embodying computer executable instructions for controlling a computer in a base station or wireless access router acting as a point of attachment for group members to an access node, said computer readable medium comprising:
  instructions for causing the computer to store group membership information indicating a set of group members associated with a wireless interface of said access node;
  instructions for causing the computer to receive multicast packets;
  instructions for causing the computer to select for each received multicast packet a first mode of multicast packet delivery based only on a number of group members in said set of group members being less than or equal to a predetermined number, said first mode of multicast packet delivery being a mode in which a separate copy of the multicast packet is transmitted to each group member in said set of group members; and
  instructions for causing the computer to select for each received multicast packet a second mode of multicast packet delivery based only on the number of group members in said set of group members being greater than said predetermined number, the second mode of multicast packet delivery being a mode in which a single copy of the multicast packet is transmitted to said set of group members, wherein the group membership information further comprises a cost estimate for transmitting a separate copy of the multicast packet to each group member in said set of group members or a cost estimate for transmitting a single copy of the multicast packet to said set of group members.

* * * * *